United States Patent [19]

Oosterling et al.

[11] 4,184,312

[45] Jan. 22, 1980

[54] BALING DEVICE FOR AGRICULTURAL CROPS

[75] Inventors: Pieter A. Oosterling, Nieuw-Vennep; Adriaan Van Zweeden, Rijsenhout, both of Netherlands

[73] Assignee: Expert N.V., Curaçao, Netherlands Antilles

[21] Appl. No.: 888,737

[22] Filed: Mar. 21, 1978

[30] Foreign Application Priority Data

May 13, 1977 [NL] Netherlands ............... 7705350
Sep. 9, 1977 [NL] Netherlands ............... 7709962

[51] Int. Cl.² .................................. A01D 39/00
[52] U.S. Cl. ............................. 56/341; 100/142; 100/187; 100/220
[58] Field of Search .............. 100/187, 189, 220, 141, 100/142, 49, 50, 100; 56/341–344

[56] References Cited

U.S. PATENT DOCUMENTS

| 190,852 | 5/1877 | Hanger | 100/187 |
| 894,876 | 8/1908 | Clark | 100/187 X |
| 1,248,753 | 12/1917 | Thompson | 100/142 |
| 1,990,526 | 2/1935 | Claar et al. | 100/187 X |
| 2,068,886 | 1/1937 | MacDonald | 100/142 X |
| 2,552,888 | 5/1951 | Druetta | 100/189 |
| 2,691,340 | 10/1954 | Nikkel | 100/187 |
| 4,034,543 | 7/1977 | Voth et al. | 100/189 |

Primary Examiner—Peter Feldman
Attorney, Agent, or Firm—John P. Snyder

[57] ABSTRACT

A device for compressing crop, for example grass, hay or the like, into bales comprising a baling chamber and a ram adapted to reciprocate therein, provided with at least one retaining member operating in the compression chamber and removable therefrom, in order to prevent that after compression the crop rebounds so that part of the empty space between the crop already compressed and the retreating ram is re-occupied by the rebounding crop, the freshly introduced quantity of crop being thus reduced.

11 Claims, 6 Drawing Figures

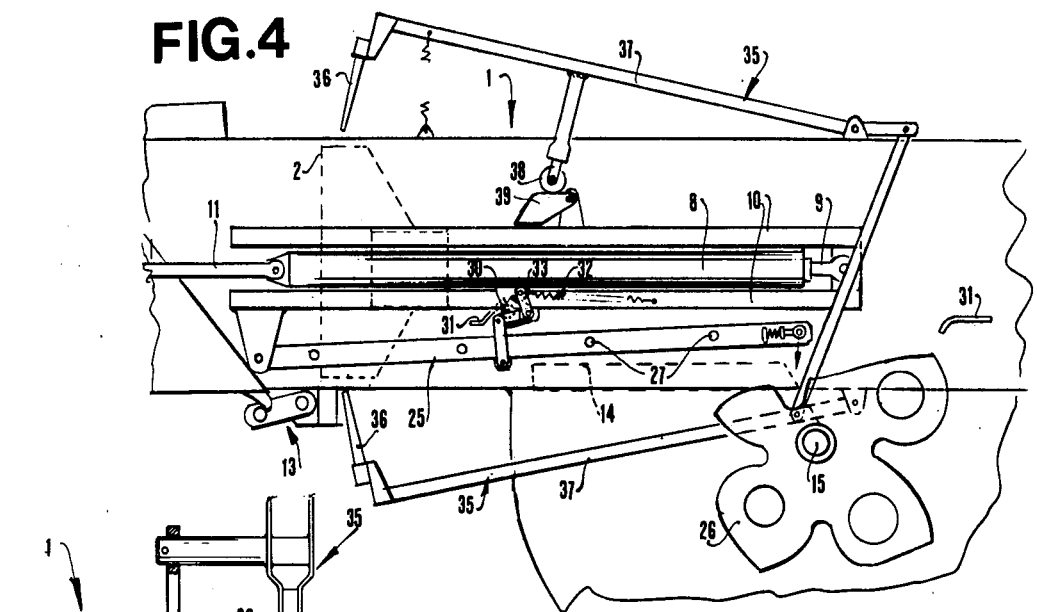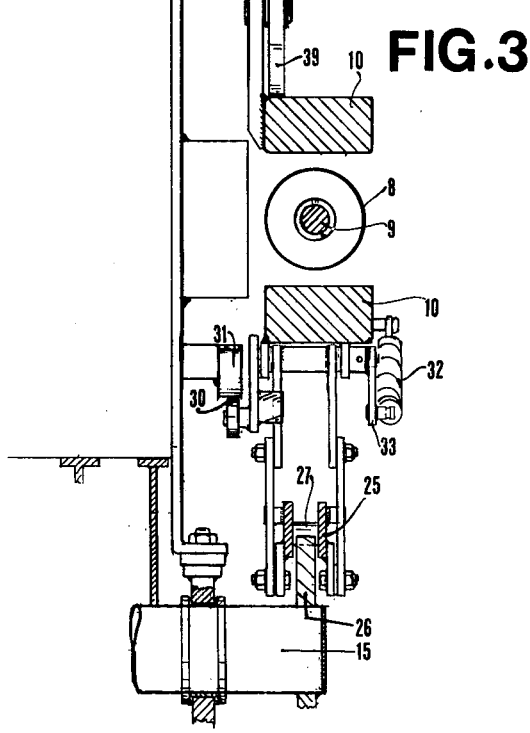

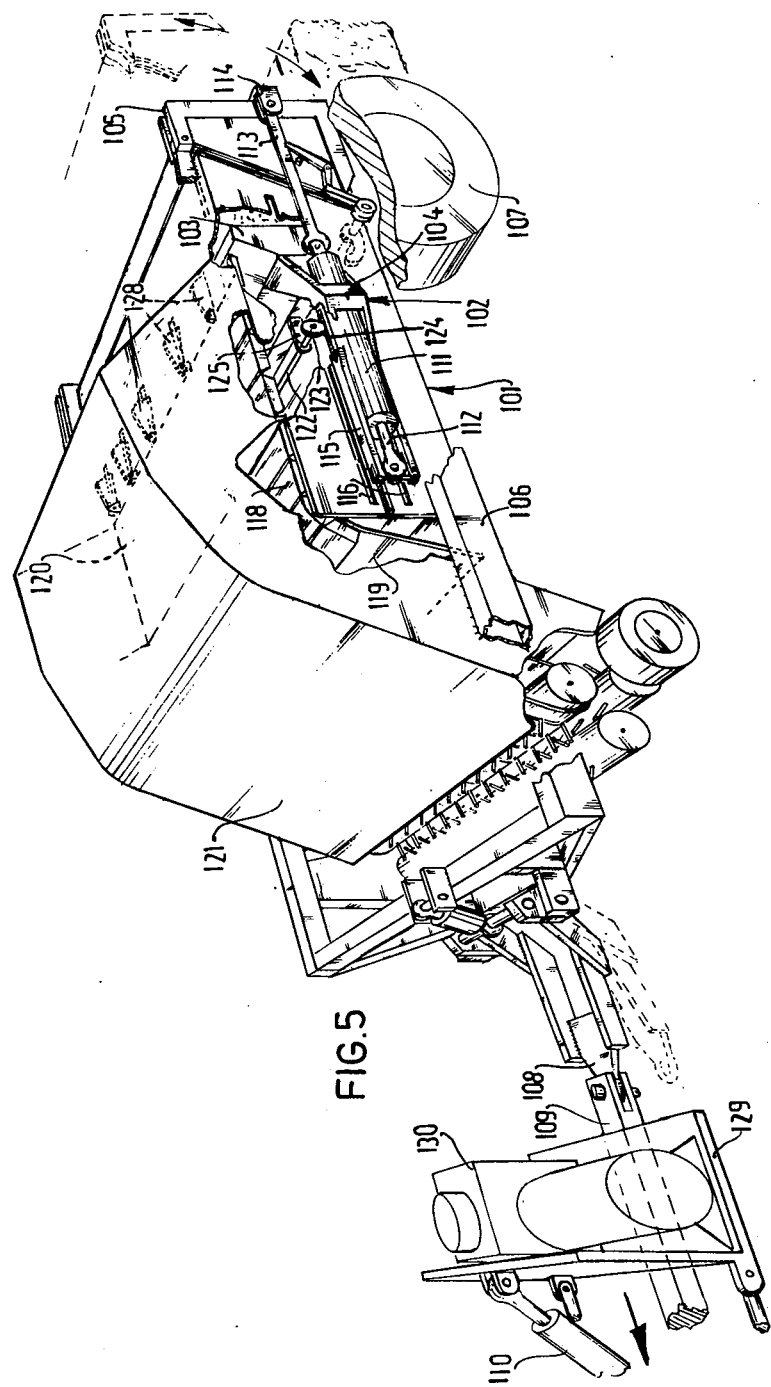

BALING DEVICE FOR AGRICULTURAL CROPS

The invention relates to a device for compressing crop, for example grass, hay or the like, into bales comprising a baling chamber and a ram adapted to reciprocate therein.

The invention has for its object to provide a baling device which is particularly suitable to form bales of high specific weight, that is to say, that large quantities of agricultural crop are compressed into comparatively small bales.

In order to reduce the risk of the ram getting out of line in the baling chamber it is advantageous to have a short stroke of the ram. One of the problems in compressing crop is that after compression the crop rebounds so that part of the empty space between the crop already compressed and the retreating ram is reoccupied by the rebounding crop, the freshly introduced quantity of crop being thus reduced.

The invention proposes to solve this problem providing the device with at least one retaining member operating in the compression chamber and removable therefrom.

In a preferred embodiment the retaining members are constructed in the form of a row of tines, each of which can be passed through an associated hole in the baling chamber wall, said rows being arranged on an auxiliary frame of the device adapted to turn with respect to the main frame, the swinging movement being derived from the reciprocatory movement of the ram. This construction provides the possibility of adjusting the cycle of the machine so that new crop may be fed and retained by the retaining members while the preceding bale is still present in the compression space.

The invention will be described more fully with reference to the drawings of an embodiment.

In the drawing:

FIG. 3 is a sectional view taken on the line III—III in FIG. 1.

FIG. 4 is a side elevation of the component parts of the actuating mechanism shown in FIG. 3.

FIG. 5 is a perspective front view of a mobile embodiment of the device.

Figure 2:
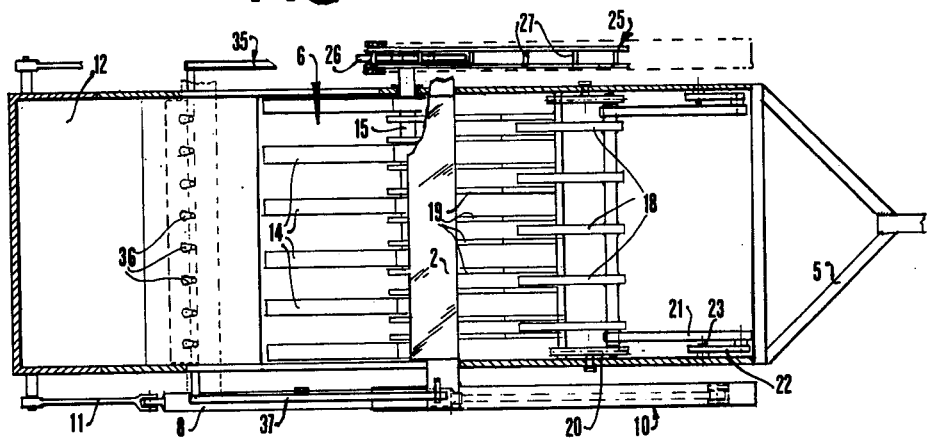
FIG. 2 is a plan view of the device of FIG. 1.
Figure 1:
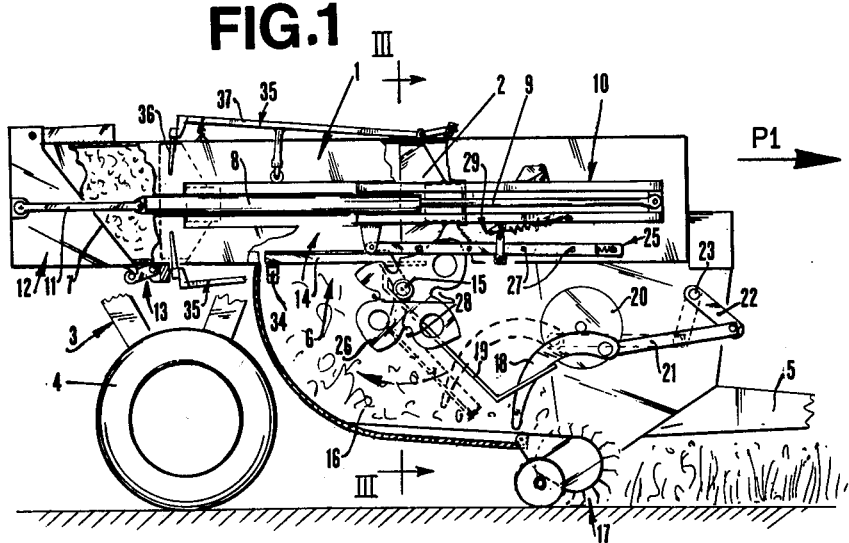
FIG. 1 is a longitudinal sectional view of an embodiment of a baling device in accordance with the invention.

The baling device shown in the FIGS. 1-4 comprises essentially a horizontal baling chamber 1, in which a ram 2 is adapted to reciprocate. The baling chamber 1 is carried by a frame 3 having a ground wheel 4 and a drawbar 5 by which the device can be attached to a tractor or the like. The device is run in the direction of the arrow P1 across the field by the tractor.

The ram 2 is movable along an inlet port 6 up to a delivery port 7, for which purpose the ram 2 is equipped with a driving mechanism arranged on either side and outside the baling chamber 1. The driving mechanism comprises a hydraulic cylinder 8, the free end of the piston rod 9 of which is connected with a pressure body 10 connected with the ram 2. The pressure body 10 comprises two hollow beams extending on either side of the cylinder 8 and being fastened at the ram 2 to ears secured to the latter. The ears of the ram 2 extend through slots in the sidewall of the baling chamber 1.

The end of the cylinder 8 remote from the piston rod 9 is connected through a coupling rod 11 with a pivotal point of the upwardly pivotable rear wall 12 of the baling chamber 1. The rear wall 12 can be locked by means of lock bolts 13 in the closed or pressing state.

The inlet port 6 can be closed by a flap portion 14, the flap portion 14 can turn through 360° about a shaft 15, which is parallel to the plane going through the inlet port 6.

With the inlet port 6 communicated an auxiliary space 16, which is located in this embodiment on the bottom side of the baling chamber 1. The entry of the auxiliary space 16 is located on the righthand bottom side in FIG. 1 and is equipped with a pick-up apparatus 17, which picks up the crop from the field and passes it into the auxiliary space 16. Pushing members 18 extending through a grid-shaped top wall 19 of the auxiliary space 16 push the crop further into the auxiliary space 16. The pushing members 18 are rotatably mounted on a rotatable disc 20, which may be driven by any suitable means and the pushing members 18 are controlled by an arm 21 rigidly secured thereto and being adapted to turn about a stub shaft 23 through a rocking arm 22. Owing to the turn of the disc 20 the pushing member 18 will describe by its free end an elliptic path so that the lower end will move substantially horizontally to the left in FIG. 1, will subsequently retract itself through the grating of the top wall 19 and will again penetrate into the inlet port of the auxiliary space 16 during the return movement.

In the embodiment shown the rotary movement of the flap portion 14, which repeatedly closes the inlet port 6 of the baling chamber 1, is obtained by means of a transmission mechanism, which utilizes the reciprocatory movement of the ram 2.

The transmission mechanism comprises a cam rod 25 pivotably mounted on the lowermost hollow beam of the pressure body and being adapted to co-operate with a cam wheel 26 rigidly secured to the shaft 15 (see also FIGS. 3 and 4).

The cam rod 25 has the shape of two parallel plates having the cams 27 mounted between them. Each cam 27 co-operates with a recess 28 of the cam wheel 26 receiving said cam. The cam rod is coupled at a distance from its pivotal joint with a shear system 29, which is controlled by a cam wheel 30, which actuates the limbs of the shear 29 by means of a rocker 40 and co-operates with a cam rack 31 rigidly secured to the baling chamber 1. A spring 32 engaging at one end the free end of a rocker arm 33 secured to the shear 29 and the other end fixed point of the ram 10 ensures locking of the shear system 29 in one of its extreme positions (see FIG. 4).

The shear system 29 serves to lift the cam rod 25 at the compression stroke of the ram 2 so that the cams 27 of the rod 25 cannot come into contact with the cam wheel 26. Conversely, during the return movement of the ram 2 the cam rod 25 will be lowered so that each cam 27 snaps in its associated recess 28 of the cam wheel 26. During said return movement the cam wheel 26 will be turned about the shaft 15 so that the flap portion 14 rigidly secured to the shaft 15 can perform a revolution of 360°, that is to say, partly through the compression space 1 behind the ram 2 and subsequently through the top wall grating 19 of the auxiliary space 16, after which the crop is advanced by the flap portion 14 into the compression space 1. The movement of the ram 2 with respect to the flap portion 14 is synchronized so that the crop gets in front of the ram 2 in the compression space 1.

The recesses 28 of the cam wheel 26 are located at different distances from the rotary axis 15 in a progressive order. This results in that initially the rotary movement of the flap portion 14 is particularly rapid, whereas after the top wall grating 19 of the auxiliary space 16 has been traversed the rotary movement of the flap portion 14 takes place more slowly, however, with an increase in pressing moment on the crop. Therefore, the crop emerging from the auxiliary space 16 is at the same time densified by the flap portion 14.

In the meantime, in the extreme retreat of the ram 2, the shear mechanism 29 has become operative so that the cam rod 25 is lifted out the cam wheel 26, after which a compression stroke can be performed. At the termination of the compression stroke the cam rod 25 again snaps into the recesses of the cam wheel 26 so that the cycle can be repeated.

In order to prevent the crop from rebounding during the return stroke of the ram 2, retaining members 35 can be passed through the top as well as the bottom wall of the baling chamber 1. The retaining members are formed by tines 36 arranged in rows mounted on an auxiliary frame 37, which is pivotable with respect to the baling chamber 1. The auxiliary frame 37 is provided with a supporting wheel 38 rolling along the upper hollow profile of the pressing member of the ram 2, said wheel co-operating with a cam 39 provided on said hollow profile. The position of the ram 39 with respect to the ram 2 is such that upon approach the retaining forks 36 are lifted before the ram 2 occupies its position indicated by broken lines in FIG. 1.

This construction furthermore permits of feeding crop even when a previously compressed bale is still present in the compression space near the delivery port 7. The drive of the ram 2 is stopped just in front of the retaining members 36 so that the crop is retained between said retaining members and the front side of the ram 2 separated from the previously compressed bale.

After the compressed bales are removed from the baling chamber, the pressing chamber is conveyed on from its stop position to its extreme position. Upon the subsequent compression stroke the ram 2 will perform its full stroke so that the partial quantity of crop previously supplied can advance to the terminal wall 12 as soon as the latter has released the previously compressed bales. The release can take place by disengaging the bolts 13 and by temporarily locking the ram 2 in the above mentioned position so that the cylinder 8 can turn the end wall 12 of the compression space 1 in upward direction.

Figure 6:
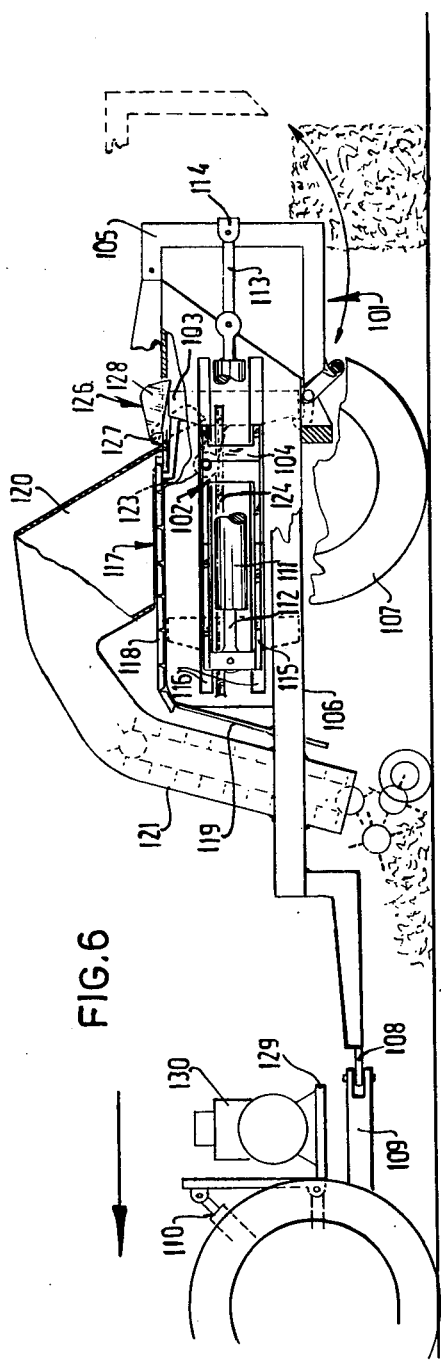
FIG. 6 is a longitudinal sectional view of the device shown in FIG. 1.

The mobile baling device according to FIGS. 5 and 6 mainly comprises horizontal baling chamber 101 in which a ram 102 is adapted to reciprocate. The ram 102 mainly comprises a pressing plate 103 corresponding to the cross-section of the baling chamber 101 and provided on either side with a pressing body 104 passed through the sidewall of the baling chamber 101. Apart from said sidewalls the baling chamber 101 comprises a top wall and a bottom wall interconnected at the right-hand top end in FIG. 5 by a closed end wall 105.

The baling chamber 101 is supported by a frame 106 supported on the rear side by a set of ground wheels 107. At the front end the frame 106 is provided with a draw ring 108 for attachment to, for example, an agricultural tractor. Of this agricultural tractor only the tool bar 109 and the three-point suspension 110 are shown.

The ram 102 is driven in the embodiment shown by two cylinders 111 extending outside the baling chamber 101 along the sidewalls thereof, the piston rod 112 engaging the free end of the pressing body 104 and the closed head walls of the cylinders being connected through a coupling rod 113 with a bracket 114 around the closed end wall 105. From the figures it will be apparent that the cylinder 111 is arranged between two parallel elements 115 of a pressing body 104, said elements 115 being adapted to slide to and fro through slots 116 in the sidewall of the compression chamber 101.

The figures show the ram 102 in the extreme final position or pressing state so that when the cylinder 111 is energized the ram 102 is moved forwards, viewed in the direction of travel, into the position indicated in FIG. 6 by broken lines. During this movement the ram 102 moves along an inlet port 117 in the top side of the baling chamber 101, which port can each time be closed by a screen 118 coupled with the pressing plate 103. When the ram 102 retreats, the screen slides with the pressing plate 103 along a guide 119 (see FIG. 6).

Above the inlet port 117 is arranged an auxiliary chamber 120, in which crop picked up from the soil and carried upwards by the elevator mechanism 121 is temporarily stored during the performance of a pressing cycle by the ram 102. When the ram 102 is withdrawn and the inlet port 117 is released by the screen 118 the temporarily stored crop in the chamber 120 will each time get in front of the pressing plate 103. During the next pressing cycle this crop is again compressed.

In the embodiment shown the top wall of the baling chamber 101 is provided with a plurality of retaining members 126 formed by a plate 128 adapted to turn about a shaft 127. The plate can drop down through a slot provided in the top wall of the baling chamber so that crop once compressed and tending to rebound when the pressing plate 103 retreats, is retained by the plates 128 penetrating into the crop.

From the figures it will be seen that the retaining members are arranged approximately near the end or pressing position of the ram 102 above the pressing plate 103, so that an optimum effect of the retainers is ensured. Nevertheless owing to their pivotable structure the plates 128 can be readily removed by the pressing plate 103 out of the baling chamber so that they will not hamper the supply of fresh crop to be compressed.

The retaining members may also be constructed in a different way; for example, parts of the baling chamber wall may be rendered pivotable inwardly about a shaft. If desired, the retainers may be arranged in other walls of the baling chamber 101 rather than the top wall thereof.

What is claimed is:

1. A device for baling a crop such as grass or the like, comprising in combination:
   a mobile frame defining a generally horizontal baling chamber having an end wall against which the crop is to be compressed and having an inlet opening spaced from said end wall;
   a ram reciprocable within said baling chamber toward and away from said end wall and drive means for reciprocating said ram between a retracted position clearing said inlet opening and an extended position adjacent said end wall;

an auxiliary chamber communicating at one end with said inlet opening and crop pick-up and feeding means at the other end of said auxiliary chamber for continuously feeding crop which is picked up into said auxiliary chamber;

transfer means for periodically transferring crop accumulated in said auxiliary chamber into said baling chamber, said transfer means being driven by said drive mens in one direction only whereby said crop transfer is effected during retracting movement of said ram; and at least one retaining member movable into said baling chamber in response to movement of said ram from its extended position and movable out of said baling chamber only when said ram is substantially in its extended position to retain the crop in compressed state as the ram moves toward said retracted position and to engage crop being compressed by the ram until said ram moves into said extended position.

2. A device as claimed in claim 1, characterized in that one or more retaining members are provided near each of at least two opposite side walls of the baling chamber.

3. A device as claimed in claim 2 characterized in that the retaining members are formed by tines adapted to pass individually through an associated opening in the sidewall of the baling chamber.

4. A device as claimed in claim 3, characterized in that each group of tines is fastened in a row to an auxiliary frame adapted to pivot with respect to the baling chamber.

5. A device as claimed in claim 4, characterized in that the pivotal movement of the auxiliary frame is derived from the reciprocatory movement of the ram.

6. A device as claimed in claim 1, characterized in that along the path of the reciprocatory movement of the ram it has a stop position in which the front face of the ram is located in front of the retaining members and a terminal position in which the front face of the ram is located beyond the retaining members.

7. A device as claimed in claim 6, characterized in that the retreating motion of the retaining members takes place when the ram moves from its stop position to its terminal position.

8. A device as claimed in claim 1, characterized in that each retaining member is formed by a plate located outside the baling chamber and being pivotably movable through an opening in the baling chamber wall.

9. A device as claimed in claim 8 wherein the plane of the plate is at right angles to the pivotal axis.

10. A device as defined in claim 1 wherein said transfer means rotates 360° from an initial position closing off said inlet opening, and said drive means including a cam rod reciprocable with said ram and including a plurality of cams, a cam wheel for rotating said transfer means and having a plurality of recesses for successively receiving said cams, and means for engaging said cam rod with said cam wheel only during retracting movement of said ram.

11. A device as defined in claim 10 wherein the recesses of said cam wheel are arranged to rotate said transfer means at different speeds during its 360° rotation.

* * * * *